United States Patent Office 3,264,342
Patented August 2, 1966

3,264,342
DERIVATIVES OF 5H-DIBENZO[a,d] CYCLOHEPTENE
Walter Schindler, Riehen, near Basel, Switzerland, assignor to Geigy Chemical Corporation, Ardsley, N.Y., a corporation of Delaware
No Drawing. Original application May 24, 1963, Ser. No. 282,874. Divided and this application Jan. 21, 1965, Ser. No. 432,931
Claims priority, application Switzerland, Mar. 14, 1961, 3,054/61
4 Claims. (Cl. 260—471)

This application is a division of copending application Serial No. 282,874, filed on May 24, 1963, which is a continuation-in-part of my pending application Serial No. 179,482 filed on March 13, 1962 (now abandoned).

The aforesaid copending application, Serial No. 282,-874, relates to derivatives of 5H - dibenzo[a,d] cycloheptene corresponding to the general Formula I

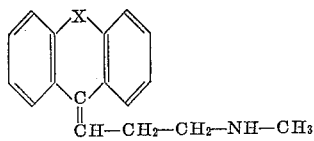

$$\overset{\|}{C}H-CH_2-CH_2-NH-CH_3 \qquad (I)$$

wherein X is an ethylene ($-CH_2-CH_2-$) or vinylene ($-CH=CH-$) radical, and their non-toxic acid addition salts with pharmaceutically acceptable inorganic and organic acids, which have valuable pharmacological properties. In particular, they antagonize the action of serotonin and of reserpine; they are also spasmolytic and decontracting, and, to a lesser extent, they are antihistaminic.

According to the said application, Serial No. 282,874, compounds I are prepared by a process which comprises (a) Reacting a tertiary amine of the formula

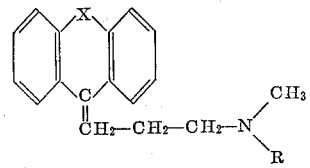

$$\overset{\|}{C}H-CH_2-CH_2-N\overset{CH_3}{\underset{R}{\diagdown}} \qquad (II)$$

wherein

R represents a benzyl radical, a lower alkenyl radical or, most advantageously, a lower alkyl radical which latter is preferably the methyl radical, and
X has the meaning given, above, with a carbonic acid halide which is a compound in which the one hydroxyl group of the carbonic acid molecule is replaced by either chlorine or bromine and the other hydroxyl group of the carbonic acid molecule is replaced by lower alkyl, especially methyl, lower alkoxy, benzyloxy, phenyl or chlorine, and of which there are preferred chloroformic acid esters, especially the lower alkyl esters such as chloroformic acid methyl ester, ethyl ester, or the benzyl ester, furthermore phosgene, a lower alkanoic acid halide such as acetyl chloride or bromide, or benzoyl chloride, in the presence or absence of a suitable inert organic solvent such as, preferably, benzene, toluene, carbon tetrachloride, but also diethyl ether, diisopropyl ether or tetrahydrofuran, at room temperature ($+20°$ C.) or at elevated temperature, up to about 110° C., preferably in the range of 40° to 110° C. The acid halides can be employed in equimolar amount or in a considerable excess and may serve in the latter case, as sole reaction medium. The reaction is exothermic and the benzyl, alkenyl or alkyl halide containing the radical R is liberated. If needed, the reaction can be performed or completed with heating:

(b) Hydrolyzing the resulting compound of the formula

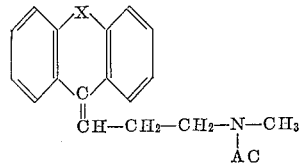

$$\overset{\|}{C}H-CH_2-CH_2-N-CH_3 \atop \underset{Ac}{|} \qquad (III)$$

wherein

Ac represents lower alkanoyl, especially acetyl, lower alkoxycarbonyl, benzyloxycarbonyl, chlorocarbonyl, or lower alkanoyl, in particular $CH_3OCO-$, $C_2H_5OCO-$, $C_6H_5-CH_2-OCO-$ and $ClCO-$, and
X has the meaning given above, hydrolysis being carried out at an elevated temperature ranging from 60 to 180° C., either in higher boiling organic solvents containing hydroxyl groups such as, e.g., ethylene glycol, diethylene glycol or the mono-lower alkyl ethers thereof, or in lower alkanols; in the latter case, the treatment may be performed in a closed vessel.

"Lower" as used in this specification and the appended claims in connection with alkyl means maximally 6 and preferably 1 to 3 carbon atoms; in connection with alkoxy and alkanoyl it means 1 to 4, and in connection with alkenyl it means maximally 6, preferred alkenyl radicals being allyl and crotyl.

The crude hydrolysis product from step (b) is then further processed as described in said application, and compounds of Formula I are obtained in very good yield rates in the order of 70% and higher (calculated on the weight of the corresponding compound of Formula II).

This is very surprising because it would have been expected that the unstable intermediate quaternary compound which is formed by the action of the acid chloride on the tertiary amine would preponderantly (a) Be decomposed due to the presence of the reactive allylic hydrogen atom to an unsymmetrically di-substituted butadiene and dialkyl alkanoyl amide, or (b) In analogy with the teachings of Renk et al. in J.A.C.S., 83, 878 (1961), give rise to the formation of a complex mixture of butylidene and/or butenyl chloride derivatives and a number of rearranged and/or ring closed products.

In contrast to the pharmacodynamic spectrum of 5-($\gamma$ - dimethyl - amino - propylidene) - 10,11 - dihydro-5H - dibenzo[a,d]cycloheptene, the corresponding monomethylamino derivative of Formula I has a pharmacodynamic spectrum with a strong antidepressive component and an attenuated antihistaminic component (very strong in the spectrum of the dimethyl amino compound), while the sedative component is negligible in contrast to that of the aforesaid dimethylamino compound.

A particularly effective process comprises taking a compound of the above-defined Formula III, wherein Ac is $CH_3OCO-$, $C_2H_5OCO-$, $C_6H_5CH_2OCO-$ or $ClCO-$, and dissolving it in a solvent such as ethylene glycol or/and diethylene or/and diethylene glycol mono-(lower)alkyl ether, e.g., diethylene glycol monoethyl ether, then hydrolyzing said compound at raised temperatures, e.g. from a temperature of about 50 degrees centigrade below the boiling point of the solvent up to a temperature corresponding to the boiling point of said solvent and not exceeding 180° C.

The term "hydrolysis" as employed here embraces alkaline as well as acid hydrolysis followed by an automatic decarboxylation to yield compounds of the above-defined Formula I.

The reaction mixture obtained from hydrolysis step (b) is then processed in a conventional manner to recover the basic constituent, for instance by evaporation of the solvent and/or dilution with water, extraction of the residue or aqueous solution with water-immiscible extractants such as chloroform, ether, benzene and the like, extracting the organic phase with aqueous dilute acid, basifying the aqueous acid extract and recovering the desired product. Yield rates are in the order of 80% and higher.

Compounds of the Formula II are commercial products; they are obtained, for example, by reaction of 5H-dibenzo[a,d]cycloheptene-5-one or 10,11-dihydro-5H-dibenzo[a,d]cycloheptene - 5 - one with a γ-dialkylamino-propyl metal compound, γ - (N - alkyl - alkenylamino)-propyl metal compound, γ-dialkenylamino-propyl metal compound or γ - (N - alkyl-benzyl-amino)-propyl metal compound, in particular with a γ-dimethylamino-propyl metal compound, and then splitting off water. Suitable compounds are in particular magnesium organic, lithium organic and zinc organic compounds. Preferably the corresponding organic magnesium halide compounds are used which are produced in the known manner from N,N-disubstituted γ-amino-propyl halides in diethyl ether, tetrahydrofuran or another ethereal solvent. The water is split off in the second step of the reaction very easily, for example, even on letting the tertiary hydroxyl compounds stand in concentrated aqueous alcoholic hydrochloric acid at room temperature.

The compounds of the Formula I produced according to the invention form salts, most of which are water soluble, with inorganic and organic acids such as hydrochloric acid, hydrobromic acid, sulfuric acid, phosphoric acid, methane sulfonic acid, ethane disulfonic acid, β-hydroxyethane sulfonic acid, acetic acid, succinic acid, fumaric acid, maleic acid, malic acid, tartaric acid, citric acid, benzoic acid, salicylic acid and mandelic acid.

Pharmaceutical compositions of the novel compound of Formula I contain this compound or non-toxic acid addition salts thereof admixed with pharmaceutically acceptable organic and/or inorganic solid or liquid carriers suitable for interal or parenteral administration. They are used, for instance, in the form of tablets, dragées, capsules or in liquid form as solutions, drops, suspensions or emulsions. Such compositions and preparations contain at least 0.5% of the active compound of Formula I. Its percentage in these preparations and compositions, of course, may be varied and may be between about 1% and about 50% or even higher of the total weight of a dosage unit. Preferred compositions and preparations are prepared in such a manner that a dosage unit form contains between about 10 mg. and about 250 mg. of the compound of Formula I.

The following examples further illustrate the performance of the process according to the invention without in any way limiting the invention to this single method. Parts are given therein as parts by weight; their relationship to parts by volume is as that of grammes to cubic centimetres. The temperatures are given in degrees centigrade: "abs." means "anhydrous"; torr stands for mm. Hg.

*Example 1*

(a) 13.0 parts of 5-(γ-dimethylamino-propylidene)-10,11-dihydro-5H-dibenzo[a,d]cycloheptene are dissolved in 100 parts by volume of abs. benzene and this solution is added dropwise while stirring strongly to 18 parts of chloroformic acid ethyl ester. The temperature rises to about 35° and methyl chloride is developed. The whole is stirred for a further 1½ hours at 40°. After cooling, the reaction solution is washed first with water and then with 2 N-hydrochloric acid, dried and concentrated. The residue is distilled under high vacuum. The 5-γ-(N-carbethoxy - methylamino) - propylidene-10,11-dihydro-5H-dibenzo[a,d]cycloheptene passes over at 164° under 0.006 torr. (Yield rate 91% calculated on the weight of the starting dibenzo cycloheptene.)

14.3 parts of the above urethane are refluxed for 20 hours in a solution of 7.0 parts of potassium hydroxide, 7.0 parts of water and 50 parts of diethylene glycol monoethyl ether. After cooling, the reaction solution is poured into 250 parts of water and exhaustively extracted with ether. The basic portions are removed from the ethereal solution by extracting four times with dilute acetic acid.

The combined acid extracts are made alkaline and the base which precipitates is taken up in ether. After drying, the ether solution is concentrated and the residue is recrystallized from pentane. The 5-(γ-methylamino-propylidene) - 10,11 - dihydro-5H-dibenzo[a,d]cycloheptene so obtained melts at 58°. (Yield rate 82% based on the weight of the above urethane derivative.) The hydrochloride prepared with alcoholic hydrochloric acid melts at 217°.

The hydrolysis of the urethane can also be performed in 50 parts of diethylene glycol or 80 parts of ethylene glycol instead of the 50 parts of diethylene glycol monoethyl ether.

(b) In the same manner as above starting from 5-(γ-dimethylamino - propylidene)-5H-dibenzo[a,d]cycloheptene in place of 5-(γ-dimethylamino-propylidene)-10,11-dihydro-5H-dibenzo[a,d]cycloheptene, 5-γ-(N-carbethoxymethylamino)-propylidene - 5H - dibenzo[a,d]cycloheptene, which boils at 185° under 0.02 mm. pressure is obtained. From this, 5-(γ-methylamino-propylidene)-5H-dibenzo[a,d]cycloheptene is obtained, the hydrochloride of which, after crystallisation from anhydrous ethanol/ether, melts at 182–184°.

*Example 2*

Example 1 is repeated, but using 100 parts of ethanol in lieu of 50 parts of diethylene glycol monoethyl ether in the hydrolysis of the methane, and refluxing for 48 hours. Similar results as in Example 1 are obtained.

I claim:

1. A compound of the formula

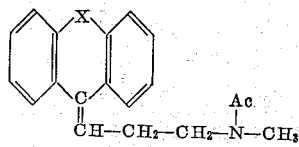

wherein X is a member selected from the group consisting of

—CH$_2$—CH$_2$— and —CH=CH— and Ac is a member selected from the group consisting of lower alkoxy carbonyl, benzyloxy carbonyl, chlorocarbonyl and lower alkanoyl.

2. 5-(γ-[N-ethoxycarbonyl - N - methylamino]-propylidene)-10,11-dihydro-5H-dibenzo[a,d]cycloheptene.

3. 5 - (γ - [N - methoxycarbonyl - N - methylamino]-propylidene)-5H-dibenzo[a,d]cycloheptene.

4. 5 - (γ - [N - ethoxycarbonyl - N - methylamino]-propylidene)-5H-dibenzo[a,d]-cycloheptene.

No references cited.

LORRAINE A. WEINBERGER, *Primary Examiner.*

L. A. THAXTON, *Assistant Examiner.*